(12) United States Patent
Darolles et al.

(10) Patent No.: US 9,166,249 B2
(45) Date of Patent: Oct. 20, 2015

(54) FLUORIDE ION BATTERY COMPOSITIONS

(75) Inventors: Isabelle Darolles, Azusa, CA (US);
Cedric M. Weiss, Azusa, CA (US);
Maksudul M. Alam, Azusa, CA (US);
Arunkumar Tiruvannamalai, Azusa, CA (US); Simon Christopher Jones, Azusa, CA (US)

(73) Assignee: California Institute of Technology, Pasadena, CA (US)

( * ) Notice: Subject to any disclaimer, the term of this patent is extended or adjusted under 35 U.S.C. 154(b) by 836 days.

(21) Appl. No.: 13/274,240

(22) Filed: Oct. 14, 2011

(65) Prior Publication Data

US 2012/0164541 A1 Jun. 28, 2012

Related U.S. Application Data

(60) Provisional application No. 61/426,456, filed on Dec. 22, 2010.

(51) Int. Cl.
| | | |
|---|---|---|
| *H01M 10/05* | (2010.01) | |
| *H01M 6/16* | (2006.01) | |
| *H01M 10/0567* | (2010.01) | |
| *H01M 10/0568* | (2010.01) | |
| *H01M 10/0569* | (2010.01) | |

(52) U.S. Cl.
CPC .............. *H01M 10/05* (2013.01); *H01M 6/164* (2013.01); *H01M 6/166* (2013.01); *H01M 6/168* (2013.01); *H01M 10/0567* (2013.01); *H01M 10/0568* (2013.01); *H01M 10/0569* (2013.01); *H01M 2300/0025* (2013.01); *H01M 2300/0045* (2013.01)

(58) Field of Classification Search
None
See application file for complete search history.

(56) References Cited

U.S. PATENT DOCUMENTS

| | | | |
|---|---|---|---|
| 4,889,659 A | 12/1989 | Genies et al. | |
| 6,221,222 B1 * | 4/2001 | Kipp et al. | 204/435 |
| 7,722,993 B2 | 5/2010 | Potanin | |
| 8,377,586 B2 | 2/2013 | Yazami et al. | |
| 2005/0147889 A1 * | 7/2005 | Ohzuku et al. | 429/231.1 |
| 2007/0042266 A1 | 2/2007 | Oh et al. | |
| 2007/0212615 A1 | 9/2007 | Jost et al. | |
| 2008/0020284 A1 | 1/2008 | Michot et al. | |
| 2008/0102373 A1 | 5/2008 | Potanin | |

(Continued)

FOREIGN PATENT DOCUMENTS

| | | |
|---|---|---|
| WO | WO 2006/101779 | 9/2006 |
| WO | WO 2006/128174 | 11/2006 |
| WO | WO 2011/072166 | 6/2011 |

OTHER PUBLICATIONS

Chambers, et al. "Naked fluoride ion from elemental fluorine". Journal of Fluorine Chemistry. Feb. 1999, vol. 94, pp. 213-215, ISSN 0022-1137. pp. 214-215.

(Continued)

*Primary Examiner* — Patrick Ryan
*Assistant Examiner* — Wyatt McConnell
(74) *Attorney, Agent, or Firm* — Lathrop & Gage LLP

(57) ABSTRACT

A lithium-free, anion based charge transport electrochemical system that uses fluoride ion transporting electrolytes, including ionic liquids, with and without various additives to improve performance, is described. The fluoride ion transporting electrolyte can be wholly or partly an ionic liquid that is typically liquid at temperatures less than 200 degrees Celsius. In other embodiments, electrolytes that remain liquid at less than 100 degrees Celsius are useful.

25 Claims, 12 Drawing Sheets

(56) References Cited

U.S. PATENT DOCUMENTS

| | | |
|---|---|---|
| 2009/0029237 A1* | 1/2009 | Yazami ........................... 429/50 |
| 2009/0203898 A1* | 8/2009 | Buchanan et al. .............. 536/58 |
| 2009/0253035 A1 | 10/2009 | Otsuki et al. |
| 2010/0221603 A1 | 9/2010 | Yazami et al. |
| 2011/0076572 A1* | 3/2011 | Amine et al. ................. 429/328 |
| 2011/0143219 A1 | 6/2011 | Weiss et al. |
| 2013/0122361 A1 | 5/2013 | Yazami et al. |
| 2014/0030559 A1 | 1/2014 | Yazami et al. |

OTHER PUBLICATIONS

PCT International Preliminary Report on Patentability for PCT/US2011/056465 (published as WO/2012/087414) issued Jun. 25, 2013.

PCT Written Opinion of the International Search Authority for PCT/US2011/056465 (published as WO/2012/087414) dated Jun. 25, 2013.

Extended European Search Report corresponding to European Patent Application No. 13176816.0, dated Oct. 1, 2013.

Mahjoub et al. (1995) "Reactions of the "Naked" Fluoride Ion: Syntheses and Structures of $SeF_6^{2-}$ and $BrF_6^{1-}$," *Chemistry—A European Journal*. 1:261-265.

Tsuda et al. (2002) "A highly conductive composite electrolyte consisting of polymer and room temperature molten fluorohydrogenates," *Solid State Ionics*. 149:295-298.

International Search Report for PCT/US2011/056465, mailed Aug. 29, 2012.

Sun et al. (Sep. 1998), "A Novel Lithium Battery Electrolyte Based on Lithium Fluoride and a Tris(pentafluorophenyl) Borane Anion Receptor in Dme", Electrochem. Solid-State Lett. 1998, vol. 1, Issue 6, 239-240.

* cited by examiner

FLUORIDE ION BATTERY COMPOSITIONS

CROSS-REFERENCE TO RELATED APPLICATIONS

This application claims priority to and benefit of U.S. Provisional Application No. 61/426,456, filed Dec. 22, 2010, and entitled "FLUORIDE ION BATTER ELECTROLYTE COMPOSITIONS", and is incorporated herein by reference.

FIELD OF THE INVENTION

Non-aqueous electrochemical cells based on fluoride ion transfer, ionic liquid and other electrolyte compositions containing fluoride ion salts, and their use in electrochemical cells, including batteries, capacitors, supercapacitors, and galvanic cells are described.

BACKGROUND

A battery generally includes a positive electrode (cathode during discharge), a negative electrode (anode during discharge) and an electrolyte for ion transport. The electrolyte can contain one or more ionic species that that act as charge carriers. Many widely available battery systems are based on cation electrode reactions, with electrodes capturing or releasing a cation from an electrolyte and balancing the charge with an electron from the external circuit. Because of its very low electrochemical oxidation/reduction potential and lightweight, the element lithium is commonly used in cation based battery systems. Both lithium and lithium-ion batteries are commercially available and widely used.

However, the electrochemistry of lithium metal or lithium containing electrodes presents problems for commercial use. Lithium metal is highly reactive, and substantial extra processing may be needed to store lithium in safer intercalate, forms, increasing battery weight and reducing energy density. Li-ion batteries are not stable in many situations, and can be easily overheated or overcharged. In extreme cases, this can result in thermal runaway and battery cell rupture, or short circuiting between the electrodes. For safety and to allow for high cycle lifetime, lithium-ion battery packs often contain expensive voltage and thermal control circuitry to shut down the battery when voltage or temperature is outside a safe range.

Use of electrochemical cells supporting anion mediated electrode reactions offer one solution to the problems associated with lithium and lithium-ion batteries. In an anion based system, the electrode captures or releases an anion from electrolyte, with concomitant release or capture of an electron from the external circuit. Such anion systems have been used in solid state battery systems, for example, by U.S. Pat. No. 7,722,993 to Potanin, which describes an embodiment of a secondary electrochemical cell where fluoride ions are reversibly exchanged between anode and cathode during charge-discharge cycles, with these electrodes in contact with a solid-state fluoride-conducting electrolyte. Potanin describes solid state electrolytes containing fluorides of La, Ce or the compound fluorides based on them together with an alloying additives, such as fluoride/fluorides of alkaline-earth metals ($CaF_2$, $SrF_2$, $BaF_2$) and/or fluorides of alkaline metals (LiF, KF, NaF) and/or alkaline metal chlorides (LiCl, KCl, NaCl), as well as a wide range of other compound fluorides.

Attempts have also been made to provide anion charge carrier based electrochemical systems capable of using liquid electrolytes. For example, US20100221603A1 "Lithium Ion Fluoride Battery" by Yazami, Darolles, and Weiss disclose a battery including a positive electrode comprising a carbon nanofiber or carbon nanotube material; a negative electrode comprising a graphite material; and an electrolyte provided between the positive electrode and the negative electrode. The electrolyte is selected to conduct charge carriers between the positive electrode and the negative electrode, and includes a solvent-borne fluoride salt is at least partially present in a dissolved state in the electrolyte. In operation, the positive electrode and negative electrode reversibly exchange fluoride ions with the electrolyte during charging and discharging of the battery. In one embodiment, during discharge of the battery fluoride ions are released from the positive electrode and accommodated by the negative electrode, and/or during charging of the battery fluoride ions are released from the negative electrode and accommodated by the positive electrode. However, for many applications the discussed electrolyte compositions do not provide sufficient ion charge transport capability to ensure reliable high discharge and/or high capacity operation.

DETAILED DESCRIPTION

Figure 1:
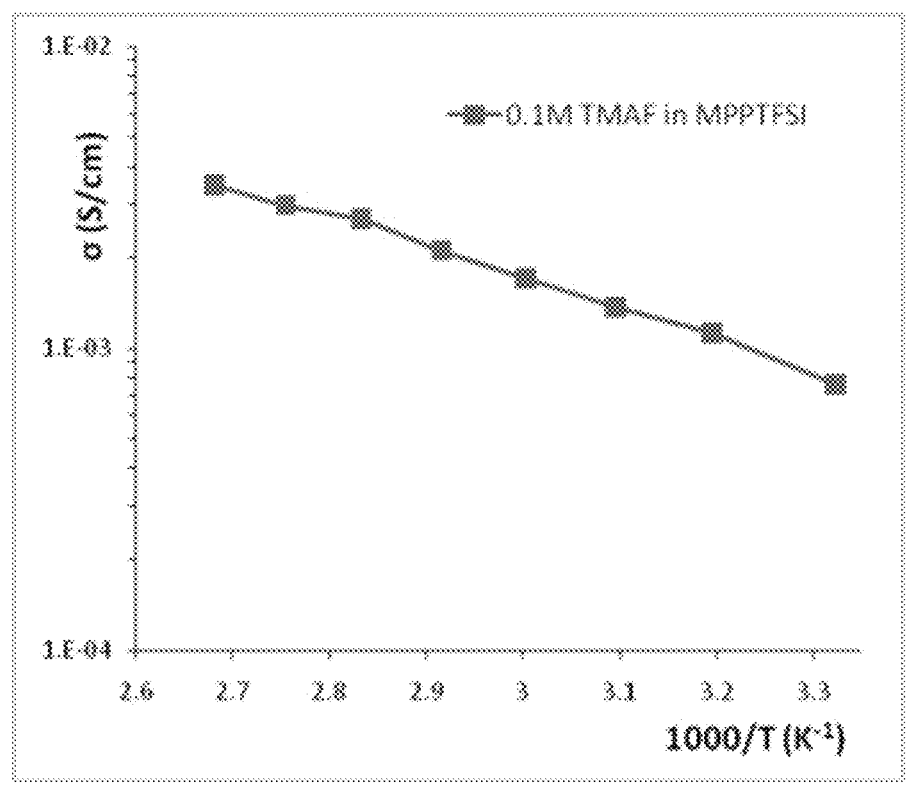
FIG. 1 shows the conductivity of a 0.1M TMAF solution in MPPTFSI as a function of temperature.

A lithium-free, anion based charge transport electrochemical system that uses fluoride ion transporting electrolytes, including ionic liquids, with and without various additives to improve performance, is described. The fluoride ion transporting electrolyte can be wholly or partly an ionic liquid that is typically liquid at temperatures less than 200 degrees Celsius. In other embodiments, electrolytes that remain liquid at less than 100 degrees Celsius are useful. In certain application, low temperature electrolytes that are liquid at temperatures greater than −40 degrees Celsius are preferred.

Such a room or low temperature fluoride ion battery (FIB) system utilizes fluoride anions carried in a liquid electrolyte as at least some of the charge carriers in an electrochemical cell. Typically, fluoride ions are majority charge carriers, but other charge carriers may also be present in certain embodiments. The FIB system has an anode and cathode physically separated from each other, but in common contact with a fluoride anion-conducting electrolyte. The anode is typically a low potential element or compound, and can be a metal, metal fluoride, or intercalating composition such as graphite or other carbon based material. Similarly, the cathode can be element or composition, and can be a metal, metal fluoride, or intercalating composition that has a higher potential than the anode. Fluoride anions (F—) in the fluoride-conducting electrolyte go from the cathode to the anode during discharge and from the anode to the cathode during the charge of the battery. As will be appreciated, operation of such a fluoride ion battery system requires a ready source of organic soluble free F— in an electrolyte solution for operation. However, common anhydrous metal fluorides such as alkali or alkaline earth fluorides (e.g. LiF, CsF, MgF2, BaF2), transition metal fluorides (e.g. VF4, FeF3, MoF6, PdF2, AgF), main-group metal fluorides (e.g. AlF3, PbF4, BiF3) and lanthanide or actinide fluorides (e.g. LaF3, YbF3, UF5) are essentially insoluble in organic solvents, so cannot be used as electrolyte components. In addition, many solid-state electrolyte compositions have poor ionic conductivity at temperatures below about 200 degrees Celsius, resulting in significant reduction in cell performance at these lower temperatures due to high cell internal resistance. Such solid-state FIB systems do not generally provide good performance at temperatures below 200 degrees Celsius.

In contrast, liquid electrolytes typically have higher conductivities at room temperatures compared to solid-state electrolytes. This permits FIB systems with liquid electrolytes, particularly ionic liquids, to operate with lower internal resistances than solid-state systems, improving performance. In addition, liquid electrolyte-based FIB systems will have applicability to areas of operation not possible for solid-state devices, such as reserve battery systems (that are activated by addition of liquid electrolyte to the system) and flexible devices (whereby a solid-state system would crack upon flexing and lose its function).

Primary and secondary electrochemical cells, such as batteries, utilizing fluoride ion charge carriers, active electrode materials, and suitable liquid electrolytes can provide an alternative to conventional state of the art lithium batteries and lithium ion batteries.

Liquid electrolyte salts suitable for FIB systems are those that contain complex cations in combination with the fluoride anion. The cation may feature organic groups, such as alkylammmonium, alkylphosphonium or alkylsulfonium species, or may consist of metal-organic or metal-coordination complex motifs, such as metallocenium species. Simple inorganic fluorides such as KF and CsF do not have sufficient solubility in non-aqueous solvents to be useful and/or may be reduced to the metal on the electrode surface at low potentials.

In one embodiment the organic-soluble fluoride salt contains alkylammonium or substituted alkylammonium cations $R_1R_2R_3R_4N^+$ F— where R1, R2, R3 and R4 may each be separately a substituted or unsubstituted, linear or branched, C1 to C50 aliphatic or cyclic aliphatic, fluoroalkyl, oligo (ethyleneglycol), aryl or substituted aryl group.

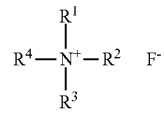

In another embodiment, the organic-soluble fluoride salt is tetramethylammonium fluoride (TMAF) as described in Christe et al., J. Am. Chem. Soc., 1990, 112, 7619, incorporated here by reference.

In another embodiment, the organic-soluble fluoride salt is 2,2-dimethylpropyltrimethylammonium fluoride (NPT-MAF) as described in Mahjoub et al., Chem. Eur. J., 1995, 1, 261, incorporated here by reference.

In another embodiment, the organic-soluble fluoride salt is 1-adamantyltrimethylammonium fluoride as described in Harmon et al., J. Org. Chem., 1993, 58, 7294, incorporated here by reference.

In another embodiment, the organic-soluble fluoride salt is phenyltrimethylammonium fluoride.

In another embodiment, the organic-soluble fluoride salt contains alkylammonium or substituted alkylammonium cations whereby one or more R-group is joined to two or more alkylammonium cations to give a dimer, oligomer or polymer $(R_1R_2R_3R_4N^+)_x$ $(F^-)_x$ where R1, R2, R3 and R4 may each be separately a substituted or unsubstituted, linear or branched, C1 to C50 aliphatic or cyclic aliphatic, fluoroalkyl, oligo(ethyleneglycol), aryl or substituted aryl group, and x=2 to 50.

In another embodiment, the organic-soluble fluoride salt is 1,2-bis(dimethylamino)-1,2-bis(dimethylammonium)ethene difluoride as described in Chambers et al., J. Fluorine Chem., 1999, 94, 213, incorporated here by reference.

In another embodiment, the organic-soluble fluoride salt contains alkylguanidinium and substituted alkylguanidinium cations $(R_1R_2N)_3$-$C^+$ F— where R1, R2, R3 and R4 may each be separately a substituted or unsubstituted, linear or branched, C1 to C50 aliphatic or cyclic aliphatic, fluoroalkyl, oligo(ethyleneglycol), aryl or substituted aryl group.

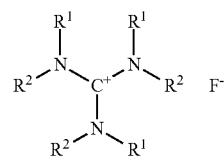

In another embodiment, the organic-soluble fluoride salt is hexamethylguanidinium fluoride as described in Kolomeitsev et al., J. Fluorine Chem., 2000, 103, 159, incorporated here by reference.

In another embodiment, the organic-soluble fluoride salt is of the form $X^+$ $F^-$ where X is a heterocyclic cation, whereby the heterocyclic ring has between 4 and 7 atoms, may be benzoannelated, may be polycyclic and/or may be substituted at one or more positions with a substituted or unsubstituted, linear or branched, $C_1$ to $C_{50}$ aliphatic or cyclic aliphatic, fluoroalkyl, oligo(ethyleneglycol), aryl or substituted aryl groups. Examples of such cations include imidazolium, thiazolium, oxazolium, isoxazolium, pyrazolium, pyridinium, piperidinium, pyrrolidinium, pyrilium, pyridazinium, pyrimidinium, pyrazinium, and triazolium, species.

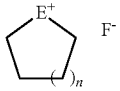

In another embodiment, the organic-soluble fluoride salt is 1-propyl,1-methyl-piperidinium fluoride.

In another embodiment, the organic-soluble fluoride salt is 1,1,3,3,5,5-hexamethylpiperidinium fluoride as described in Mahjoub et al., Chem. Eur. J., 1995, 1, 261, incorporated here by reference.

In another embodiment, the organic-soluble fluoride salt is 1-methylhexamethylenetetramine fluoride (HMTF) as described in Gnann et al., J. Am. Chem. Soc., 1997, 119, 112, incorporated here by reference.

In another embodiment, the organic-soluble fluoride salt is a phosphazene or phosphazenium-containing material such as 1,1,1,3,3,3-hexakis(dimethylamino)diphosphazenium fluoride and tetrakis[tris(dimethylamino)-phosphoranylidenamino]phosphonium fluoride as described in Schwesinger et al., Chem. Eur. J., 2006, 12, 438, incorporated here by reference.

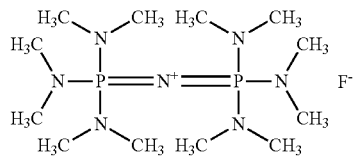

In another embodiment, the organic-soluble fluoride salt contains alkylphosphonium or substituted alkylphosphonium cations R1R2R3R4P+ F— where R1, R2, R3 and R4 may each be separately a substituted or unsubstituted, linear or branched, C1 to C50 aliphatic or cyclic aliphatic, fluoroalkyl, oligo(ethyleneglycol), aryl or substituted aryl group.

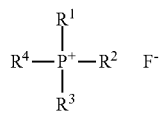

In another embodiment, the organic-soluble fluoride salt is tetramethylphosphonium fluoride, as described in Komath et al., Inorg. Chem., 2003, 42, 2894, incorporated here by reference.

In another embodiment, the organic-soluble fluoride salt is tetraphenylphosphonium fluoride, as described in Brown et al., J. Chem. Soc., Chem. Commun, 1983, 1256, incorporated here by reference.

In another embodiment, the organic-soluble fluoride salt is phenyltrimethylphosphonium fluoride.

In another embodiment, the organic-soluble fluoride salt contains alkylsulfonium or substituted alkylsulfonium cations R1R2R3S+ F— where R1, R2 and R3 may each be separately a substituted or unsubstituted, linear or branched, C1 to C50 aliphatic or cyclic aliphatic, fluoroalkyl, oligo(ethyleneglycol), aryl or substituted aryl group.

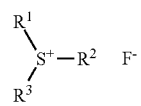

In another embodiment, the organic-soluble fluoride salt is trimethylsulfonium fluoride.

In another embodiment, the organic-soluble fluoride salt contains metal-organic, substituted metal-organic or metal-coordination complex species [R1,R2,R3 ... M]n+Fn- where R1, R2, R3 (and so on) may each be separately a particular ligand species. Suitable ligands include carbocyclic or heterocyclic organometallic ligands such as cyclopentadienyls, benzenes, cyclobutadienes, pyridines, phenanthrolines or phosphacyclopentadienyls and their isolobal analogues, which may be unsubstituted or substituted with a linear or branched, C1 to C50 aliphatic or cyclic aliphatic, fluoroalkyl, oligo(ethyleneglycol), aryl or substituted aryl group. Other suitable ligand species include alkyls, alkenes, alkynes, alkynyls, carbonyls, amines, phosphines, halides, hydrides, nitriles, isonitriles and related ligands as described in "Dictionary of Organometallic Compounds," J. E. Macintyre and J. D. MacDonald eds., 2nd Edition, Chapman & Hall, London, 1995 and "Dictionary of Inorganic Compounds," J. E. Macintyre ed., Chapman & Hall, London, 1992. The metal species may be a main-group metal, transition metal or lanthanide metal accordingly, and the number of ligands (R1 ... ) may be from 1 to 8.

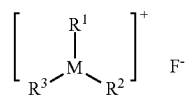

In another embodiment, the organic-soluble fluoride salt is cobaltocenium fluoride, as described in Bennett et al., J. Am. Chem. Soc., 1994, 116, 11165, incorporated here by reference.

In another embodiment, the fluoride-containing electrolyte is a molten salt (also known as a room-temperature ionic liquid (IL)) X+ F—(HF)n, where X+ is a cation corresponding to any of the classes described above and n is between 0 and 5.

In another embodiment, the electrolyte is acidic 1-ethyl-3-methylimidazolium fluoride (EMIF.(HF)2.3) as described in Hagiwara et al., J. Fluorine Chem, 1999, 99, 1 or related compound (whereby the amount of incorporated HF differs).

In another embodiment, the electrolyte is acidic 1-methyl-1-propylpiperidinium fluoride (MPPF.(HF)n) where n is around 2.3, or related compound (whereby the amount of incorporated HF differs).

In another embodiment, the organic-soluble fluoride salt contains a cation that is a polymer species such as —[Z-Het+-X-Het+-]-n, whereby Het is a heterocyclic cation whereby the heterocyclic ring has between 4 and 7 atoms, may be benzoannelated, may be polycyclic and/or may be substituted at one or more positions with a substituted or unsubstituted, linear or branched, C1 to C50 aliphatic or cyclic aliphatic, fluoroalkyl, oligo(ethyleneglycol), aryl or substituted aryl groups, and Z and X are spacer group such as CH2, CMe2, SiMe2, SO2, P=O, C2 to C50 aliphatic or cyclic aliphatic, fluoroalkyl, oligo(ethyleneglycol), aryl or substituted aryl groups, and may be the same or different from each other, and n is about 1 to 8.

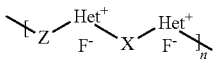

In another embodiment, the organic-soluble fluoride salt is poly(1,1-dimethyl-3,5-dimethylene piperidinium)fluoride, as described in Rios et al., J. Poly. Sci. B. Poly. Phys., 1990, 28, 505, incorporated here by reference.

Solvents

Useful solvents include those that are non-aqueous (denoted here as "organic") and are capable of dissolving the aforementioned fluoride salts to molar concentrations of 0.01 M and above, preferred concentrations being between 0.1 and 3 M. Examples of such solvents include acetone, acetonitrile, benzonitrile, 4-fluorobenzonitrile, pentafluorobenzonitrile, triethylamine (TEA), diisopropylethylamine, 1,2-dimethoxyethane, ethylene carbonate, propylene carbonate (PC), γ-butyrolactone, dimethyl carbonate, diethyl carbonate (DEC), methyl ethyl carbonate, propyl methyl carbonate, tetrahydrofuran, 2-methyltetrahydrofuran, nitromethane, benzene, toluene, chloroform, dichloromethane, 1,2-dichloroethane, dimethylsulfoxide, sulfolane, N,N-dimethylformamide (DMF), N,N-dimethylacetamide (DMA), carbon disulfide, ethyl acetate, methyl butyrate, n-propyl acetate, methyl propionate, methyl formate, 4-methyl-1,3,-dioxolane, pyridine, methyl isobutyl ketone, methyl ethyl ketone, hexamethylphosphoramide, hexamethylphosphorus triamide, 1-methyl-2-pyrrolidinone, 2-methoxyethyl acetate, trimethyl borate, triethylborate and substituted derivatives thereof, as well as sulfones such as ethylmethylsulfone, trimethylene sulfone, 1-methyltrimethylene sulfone, ethyl-sec-butyl sulfone, ethyl isopropyl sulfone (EIPS), 3,3,3-trifluoropropylmethyl sulfone and 2,2,2-trifluoroethyl sulfone.

In certain embodiments, room temperature ionic liquid materials, or ionic liquids that remain liquid at temperatures below 200 degrees Celsius (such as those described in "Electrochemical Aspects of Ionic Liquids", E. Ohno ed., Wiley Interscience, New York, 2005), are preferred. These can include ionic liquids that remain liquid at temperatures below 100 degrees Celsius such as 1-methyl,1-propylpiperidinium bis(trifluoromethanesulfonyl)imide (MPPTFSI), butyltrimethylammonium bis(trifluoromethanesulfonyl)imide (BT-MATFSI) 1-butyl, 1-methylpyrrolidinium bis(trifluoromethanesulfonyl)imide (BMPTFSI) and their fluoroalkylphosphate (FAP) anion derivatives (e.g. MPPFAP, BMPFAP) where FAP is a hydrophobic anion such as tris (pentafluroethyl)trifluorophosphate, all of which alone or in combination are useful solvents.

Preferred solvents include MPPTFSI, BMPFAP, benzonitrile, N,N-dimethylformamide (DMF), DMA and TEA.

In certain cases, electrolyte formulations may have a voltage stability window of 1V or less, or around 2V, or greater than 4V, depending on the salt and solvent combination.

Electrolyte Additives

In certain embodiments, solubility of fluoride salts in liquid electrolytes may be enhanced through addition of electrolyte additives that can improve stability, viscosity, performance, or safety. One particular class of additives is fluoride ion complexing Lewis acid species (also known as "anion receptors"). While not wishing to be bound by any particular theory, anion receptor species are believed to reversibly bind to the fluoride ion in solution, increasing the amount of fluoride salt that is dissolved in that solution. In addition, as the complexation is reversible, these anion receptors may bind or release fluoride ion to or from a fluoride-accommodating electrode at a particular voltage. This reversible complexation, so that substantial "free" F— is not present in significant concentration in solution, may provide enhanced cycling stability to the electrochemical system. Suitable anion receptors include species capable of binding fluoride anion such as boron, aluminum, ammonium, H-bond donor or similar groups, including aza ethers and alkyl and aryl boron and boronate complexes such as those described in McBreen et al, J. Power Sources, 2000, 89, 163 and West et al., J. Electrochem. Soc., 154, A929 (2007), and boroxin species such as those described in Nair et al., J. Phys. Chem. A, 113, 5918 (2009), all of which are incorporated by reference herein. In particular tris(hexafluoroisopropyl)borate, tris(pentafluorophenyl)borane and all possible regioisomers of difluorophenyl boroxin (DFB), trifluorophenyl boroxin, bis(trifluoromethyl)phenyl boroxin, trifluoromethyl)phenyl boroxin and fluoro(trifluoromethyl)phenyl boroxin can be used.

In certain other cases, conductivity of a fluoride ion electrolyte solution may be enhanced through addition of additional solvents, by reduction of overall solution viscosity (amongst other factors). In particular, use of ionic liquid solvents such as MPPTFSI gives a somewhat viscous electrolyte mixture, for which the conductivity can be enhanced by addition of other compatible low viscosity solvents. These can include polar aprotic solvents such as diethyl carbonate (DEC) (~20%), ethyl isopropyl sulfone (EIPS) (~100%) or N,N-dimethylformamide (DMF) (~100%), or fluoralkyl species such as perfluoroethers and perfluoropolyethers.

Electrodes

A wide range of electrode materials can be used in conjunction with the described liquid electrolytes. To improve safety, lithium-free electrodes, or substantially lithium-free, or electrodes with low weight percentage lithium (for example, less than 10 percent lithium) are preferred. Electrodes can be anodes or cathodes. Here, the term "anode" shall be meant to refer to the electrode with more negative relative reduction potential when the cell is in the charged state, and "cathode" shall be meant to refer to the electrode with more positive relative reduction potential. Therefore, during discharge the general form of fluoride-ion mediated processes occurring at the electrodes are:

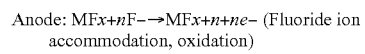
Anode: $MF_x + nF^- \rightarrow MF_{x+n} + ne^-$ (Fluoride ion accommodation, oxidation)

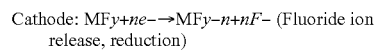
Cathode: $MF_y + ne^- \rightarrow MF_{y-n} + nF^-$ (Fluoride ion release, reduction)

During charge, the reverse reactions occur.

Anode Materials:

i) Any metal M of the periodic table in the charged state or corresponding metal fluoride $MF_n$ in the discharged state having a standard potential E0 more negative than the standard potential of the cathode material (n being larger than zero).

ii) Any alloy of any metals MM1M2 . . . Mn in the charged state or corresponding alloy metal fluoride MM1M2 . . . MnFm in the discharged state having a E0 more negative than the E0 of the cathode material.

iii) Any metal fluoride $MF_n$ in the charged state that can undergo a further fluorination to $MF_{n+x}$, or $MF_{n+x}$ in the discharged state that has an intermediate oxidation state (metal oxidation state higher than zero) having a standard potential more negative than the cathode material.

iv) Any metal oxide $MO_x$ in the charged state or corresponding metal oxide fluoride $MO_xF_n$ in the discharged state having a standard potential E0 lower than the standard potential of the cathode material v) Any alloy MM1M2 . . . MnOxFm with n larger or equal to 2 and m being larger or equal to zero.

vi) Any polymer that can accommodate fluoride anions in its structure having a standard potential E0 lower than the standard potential of the cathode material including (but not limited to) polyanilines, polypyrroles, polyacetylenes, polythiophenes, polypyrroles, polyethylenedioxythiophenes, polyphenylenes, polytriphenylenes, polyazulenes, polycarbazoles, polyfluorenes, polynaphthalenes, polyanthracenes, polyacenes. Such polymer may contain associated anions or cations (corresponding to partially-oxidized or partially-reduced forms), or may be in the neutral state.

vii) Any anion-intercalation host material such as a Layered Double Hydroxide (LDH), metal oxide or metal chalcogenide that can accommodate fluoride anions into its structure having a standard potential E0 more negative than the standard potential of the cathode material.

viii) A carbon fluoride material CFx that can accommodate fluoride anions into its structure having a standard potential E0 more negative than the standard potential of the cathode material. Here, x is between 0.05 and 2, with the region 0.05 to 0.6 particularly preferred. Such carbon materials may be graphite based, coke-based, or based on nanomaterials such as carbon nanontubes, graphene or assemblies of such nanomaterials similar to that described by Lee et al., Nature Nanotech., 5, 513 (2010), incorporated here by reference.

Any mixture of one or more of the above mentioned type of materials can also be used.

Cathode Materials:

i) Any metal M of the periodic table in the discharged state or corresponding metal fluoride MFn in the charged state having a standard potential E0 more positive than the standard potential of the anode material. n being larger than zero.

ii) Any alloy of any metals MM1M2 . . . Mn in the discharged state or corresponding alloy metal fluoride MM1M2 . . . MnFm in the charged state having a E0 more positive than the E0 of the anode material.

iii) Any metal fluoride MFn in the discharged state that can accommodate more fluoride to MFn+x or MFn+x in the charged state that has an intermediate fluorination state (metal oxidation state higher than zero) having a standard potential more positive than the anode material.

iv) Any metal oxide MOx in the discharged state or corresponding metal oxide fluoride MOxFn in the charged state having a standard potential E0 more positive than the standard potential of the anode material.

v) Any metal oxide MOxFn in the discharged state or further fluorinated metal oxide fluoride MOxFn+x in the charged state having a standard potential E0 more positive than the standard potential of the anode material.

vi) Any alloy MM1M2 . . . MnOxFm with n larger or equal to 2 and m being larger or equal to zero.

vii) Any polymer that can accommodate fluoride anions in its structure having a standard potential E0 more positive than the standard potential of the anode material including (but not limited to) polyanilines, polypyrroles, polyacetylenes, polythiophenes, polypyrroles, polyethylenedioxythiophenes, polyphenylenes, polytriphenylenes, polyazulenes, polycarbazoles, polyfluorenes, polynaphthalenes, polyanthracenes, polyacenes. Such polymer may contain associated anions or cations (corresponding to partially-oxidized or partially-reduced forms), or may be in the neutral state.

viii) Any anion-intercalation host material such as an LDH, metal oxide or metal chalcogenide that can accommodate fluoride anions into its structure having a standard potential E0 more positive than the standard potential of the anode material.

ix) A carbon fluoride material CFx that can accommodate fluoride anions into its structure having a standard potential E0 more positive than the standard potential of the anode material. Here, x is between 0 and 2, with the region 0 to 0.6 particularly preferred. Such carbon materials may be graphite based, coke-based, or based on nanomaterials such as carbon nanontubes, graphene or assemblies of such nanomaterials similar to that described by Lee et al., Nature Nanotech., 5, 513 (2010), incorporated here by reference.

Any mixture of one or more of the above mentioned type of materials is also contemplated. However, pure materials, substantially pure materials, or mixtures of materials that include electrode materials with solid state fluoride ion conductivity >10-12 S/cm are preferred. Solid-state fluoride ion conductivity values may be found, for example, in N. I. Sorokin and B. P. Sobolev, Crystallography Reports, 52, 842 (2007) incorporated herein by reference.

Using the described electrodes and electrolytes, along with separators, battery casing or packaging, current collectors, electrical contacts, electronic charge and discharge controllers, and other elements of battery construction known to those skilled in the art, one can create useful electrochemical cells operable at less than 200 degrees Celsius that do not require lithium for operation. Such electrochemical cells can have substantially irreversible electrochemical reactions during discharge, making them suitable for forming galvanic cells or primary batteries. Alternatively, if the electrochemical reaction is at least partially reversible through application of electrical charge, secondary (rechargeable) batteries can be formed.

As will be appreciated, fluoride ion batteries are suitable for a wide range of primary or rechargeable applications, including but not limited to vehicle traction batteries (electric vehicles (EV), hybrid vehicles (HEV), and plug-in hybrid (PHEV)) or vehicle starter or ignition batteries. FIB systems can be useful stationary batteries for emergency power, local energy storage, starter or ignition, remote relay stations, communication base stations, uninterruptible power supplies (UPS), spinning reserve, peak shaving, or load leveling, or other electric grid electric storage or optimization applications. Small format or miniature battery applications including watch batteries, implanted medical device batteries, or sensing and monitoring system batteries (including gas or electric metering) are contemplated, as are other portable applications such as flashlights, toys, power tools, portable radio and television, mobile phones, camcorders, lap-top, tablet or hand-held computers, portable instruments, cordless devices, wireless peripherals, or emergency beacons. Military or extreme environment applications, including use in satellites, munitions, robots, unmanned aerial vehicles, or for military emergency power or communications are also possible.

The following specific examples are given to illustrate the practice of the invention, but are not to be considered as limiting in any way.

EXAMPLES

1) Conductivity of FIB Electrolytes

FIG. 1 shows the conductivity of 0.1M TMAF in 1-methyl-1-propylpiperidinium bis(trifluoromethanesulfonyl)imide (MPPTFSI) as a function of temperature, indicating conductivity increase as the solution viscosity decreases.

2) Electrochemical Stability of FIB Electrolytes

Figure 2:
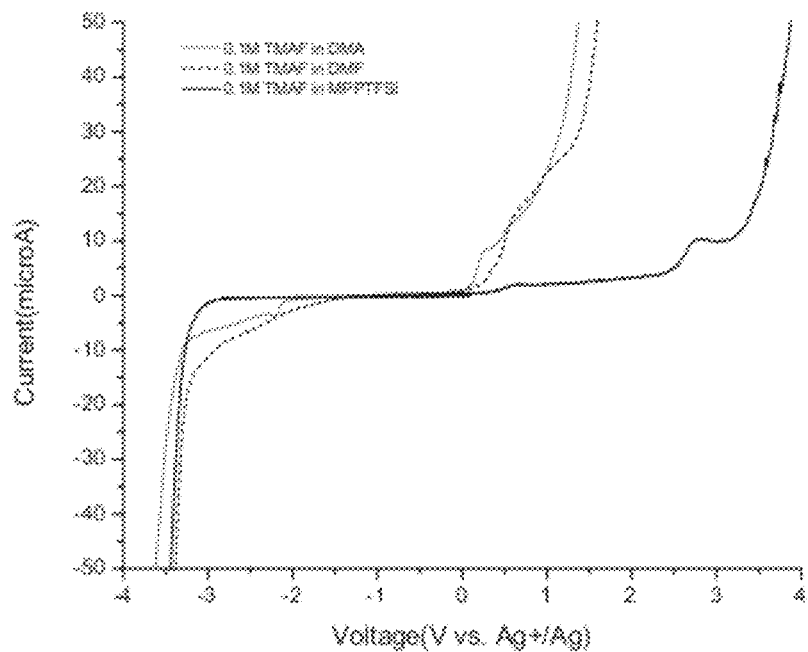
FIG. 2 shows the electrochemical stability window for solutions of TMAF in various solvents.
Figure 3:
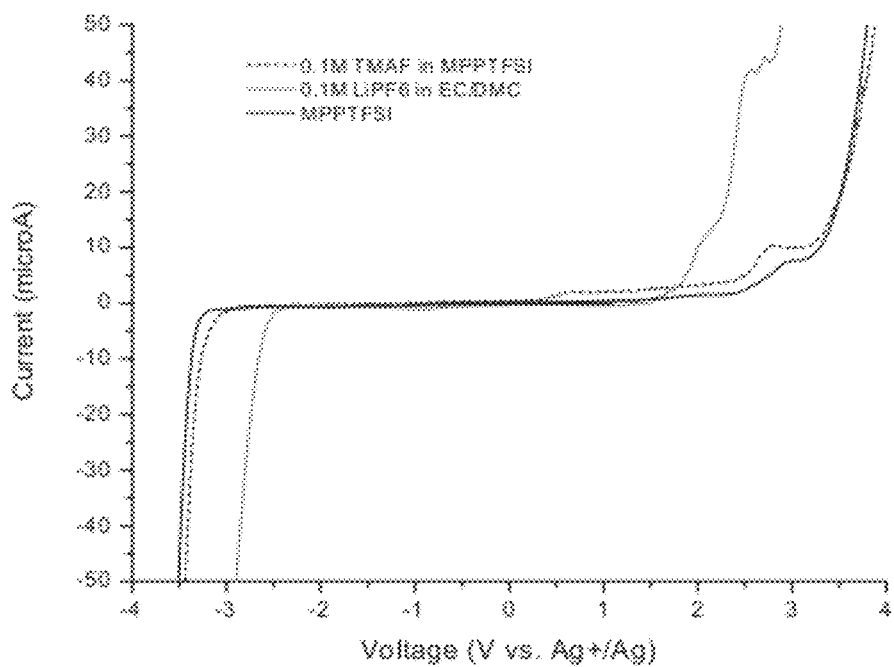
FIG. 3 shows the electrochemical stability windows for 0.1M TMAF-MPPTFSI and MPPTFSI compared to a typical liquid phase Li-ion electrolyte.

FIGS. 2 and 3 show linear sweep voltammetry experiments (2 mV/sec) for several electrolyte formulations, indicating that a stable voltage window >4V can be obtained in certain cases for liquid phase FIB electrolytes, and that this stability window can be greater than for Li-ion electrolytes such as 0.1M LiPF6 in EC/DMC.

3) Examples of Theoretical Standard Potentials for Some FIB Electrode Materials

To better understand various aspects of the disclosure, consider the example system La/F⁻ electrolyte/$CoF_3$ The extended cell reaction being:

$$La + CoF_3 \leftrightarrow LaF_3 + Co \qquad \text{Eq. 1}$$

From the following Table 1 and Eq. 1, one can calculate the voltage and the theoretical energy density of this example system as:
Voltage=3.5 V
Energy density=1100 Wh/kg or 5400 Wh/L
Similarly, using the following Table 1 and selected cell reactions, one can calculate the voltage and the energy density for other electrochemical systems.

TABLE 1

| Cathode | Anode | Voltage (V) | Specific energy (Wh/kg) | Energy density (Wh/L) |
|---|---|---|---|---|
| $CoF_3$ | Ca | ≈5 | 1005 | 3190 |
| $PbF_4$ | Ca | ≈4.6 | 780 | 3700 |
| $SnF_4$ | Ca | ≈3 | 685 | 2415 |
| $FeF_3$ | Ca | ≈3.6 | 725 | 2295 |
| $BiF_3$ | Ca | ≈3.2 | 790 | 2905 |
| $CuF_2$ | Ca | ≈3.2 | 1210 | 3445 |
| PANI-F | Ca | ≈4 | 475 | 580 |
| $CFx_{(x\sim 0.8)}$ | Ca | ≈5 | 2465 | 4685 |
| $CFx_{(x\sim 0.8)}$ | Mg | ≈4.5 | 2615 | 5375 |
| $CoF_3$ | Mg | ≈4.4 | 920 | 3185 |
| $PbF_4$ | Mg | ≈4.1 | 715 | 4505 |
| $FeF_3$ | Mg | ≈3.1 | 665 | 2300 |
| $CoF_3$ | Ti | ≈3.3 | 670 | 2650 |

4) Preparation of a $PbF_2$/FIB Electrolyte/PANI FIB Coin Cell $PbF_2$ is milled along with carbon black. The resultant powder is then mixed with PVDF or PTFE and lightly graphitized conductive carbon black. A film is prepared and disk electrodes (14 mm diameter) are punched. Pellets can also be pressed from the same mixture (but dry and mixed with mortar and pestle) prior to overnight drying. Film electrodes and pellet electrodes are kept in a dry environment until being used in a cell.

PANI electrodes are prepared as follows: PANI powder is mixed with lightly graphitized conductive carbon black. Pellets or films can be 2016 coin cells can then be assembled. Pellets are soaked in the electrolyte to insure a good wetting. Film electrodes are soaked with a few drops of electrolyte. The cell can be assembled using the $PbF_2$ electrode on one side of the can, the PANI electrode on the other side with a polypropylene separator in between soaked with the electrolyte. Depending on the total thickness of the sandwich, stainless steel spacers and/or stainless steel spring can be included on one side of the can to ensure good stacking pressure inside the cell. The cell is then crimped and the excess electrolyte is washed away. The cell is then ready for testing in a cycler.

5) Preparation of Pouch Cells

Lead fluoride is milled along with carbon black. The resultant powder is then mixed with PVDF and lightly graphitized conductive carbon black. The mixture is then sprayed on a heated aluminum substrate layer by layer up to a thickness of several tens of microns. The film is then dried and kept in a dry environment until being used in a cell.

Polyaniline films are prepared by mixing polyaniline powder with lightly graphitized conductive carbon black and. The mixture is sprayed on a heated aluminum substrate layer by layer up to a thickness of several tens of microns. The film is then dried and kept in a dry environment until being used in a cell.

Small pouch cells can then be assembled by cutting rectangular shape electrodes from the previously prepared films and tabs are welded on the aluminum substrate for electrical contact. The cell can then be assembled using lead fluoride electrode as the anode, polyaniline electrode as the cathode with polypropylene separator (slightly bigger than the electrodes) in between. The sandwich is then put in a pouch material cut to the right dimensions and three sides of the pouch are heat sealed. The electrolyte is then injected inside the cell and vacuum soaked for a few minutes before testing in a cycler.

6) Charge-Discharge Characteristics of $PbF_2$/FIB Electrolyte/PANI Cell

Figure 4:
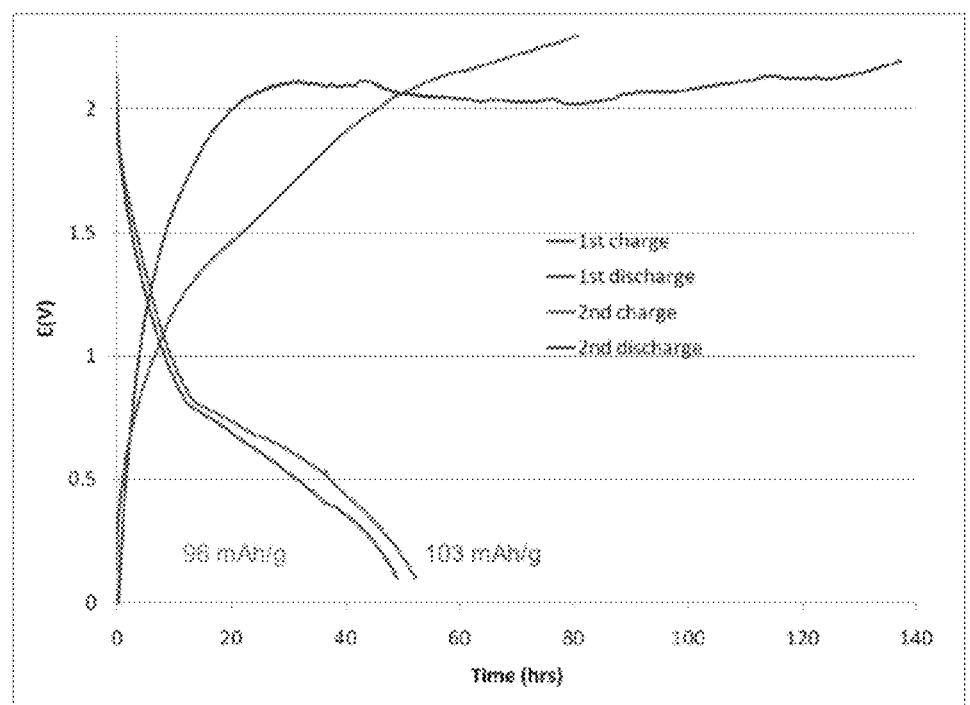
FIG. 4 shows the first and second charge and discharge curves for a $PbF_2$/TMAF-MPPTFSI/PANI cell assembled in the discharged state.

FIG. 4 shows the first and second charge and discharge curves for a PbF2/TMAF-MPPTFSI/PANI cell assembled in the discharged state. Discharge capacity observed is around 100 mAh/g.

Without wishing to be bound by any particular theory, this process is consistent with electrode reactions:

$PbF_2 + 2e^- \rightarrow Pb + 2F^-$ (at the anode)

$2PANI + 2F^- \rightarrow 2PANI^+F^- + 2e^-$ (at the cathode)

7) Use of Other Fluoride Salts in the Electrolyte

Figure 5:
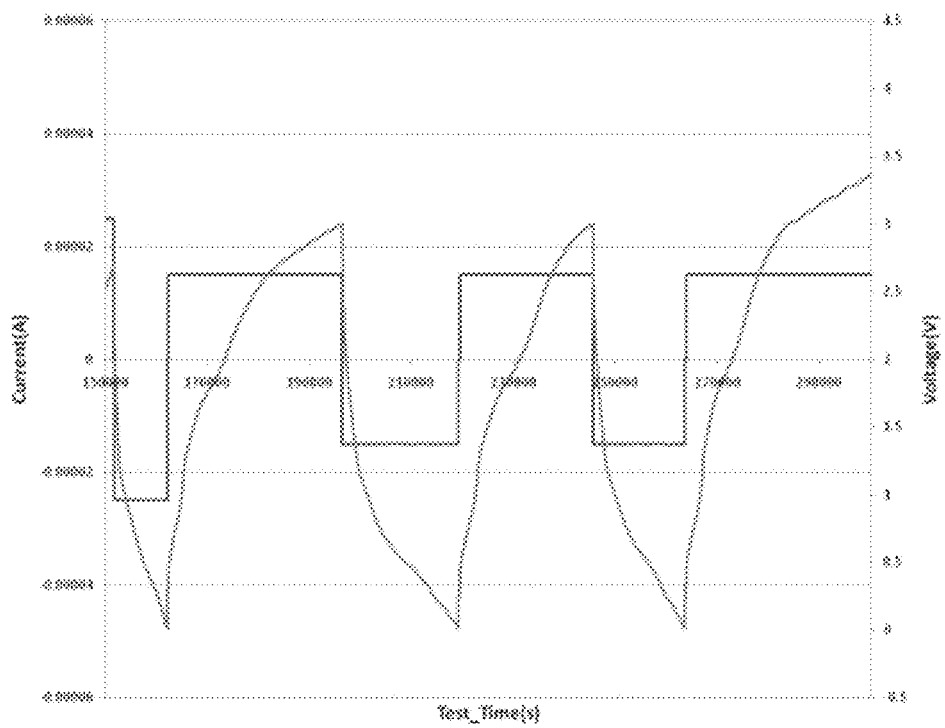
FIG. 5 shows the first and second charge and discharge curves for a $PbF_2$/NPTMAF-MPPTFSI/PANI cell assembled in the discharged state.

FIG. 5 shows charge/discharge curves for a PbF2/NPT-MAF-MPPTFSI/PANI cell assembled in the discharged state. NPTMAF (neopentyltrimethylammonium fluoride) is more soluble in common organic solvents and ionic liquids than TMAF, and a 0.4 M solution in MPPTFSI may be prepared with conductivity around 1 mS/cm.

Figure 6:
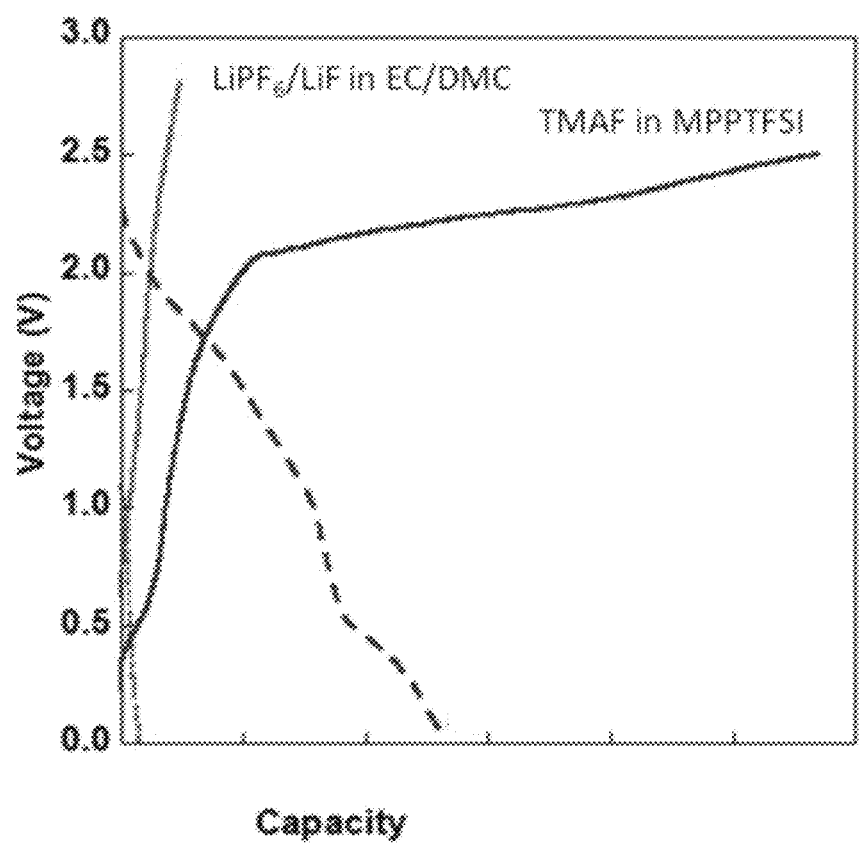
FIG. 6 shows charge-discharge curves for $PbF_2$/electrolyte/PANI cells (3rd cycle) containing TMAF-MPPTFSI electrolyte compared to 0.5 M LiF/1M $LiPF_6$ in EC/DMC electrolyte.

8) Characterizing Data for Charge of $PbF_2$/electrolyte/PANI Cells to Distinguish Electrolyte Effects FIG. 6 shows charge-discharge curves for PbF2/electrolyte/PANI cells (3rd cycle) containing TMAF-MPPTFSI electrolyte (as taught here) alongside 0.5 M LiF/1M LiPF6 in EC/DMC electrolyte as taught in US 2009/0029237 A1. The TMAF-MPPTFSI system delivers significant capacity upon electrochemical cycling.

Figure 7:
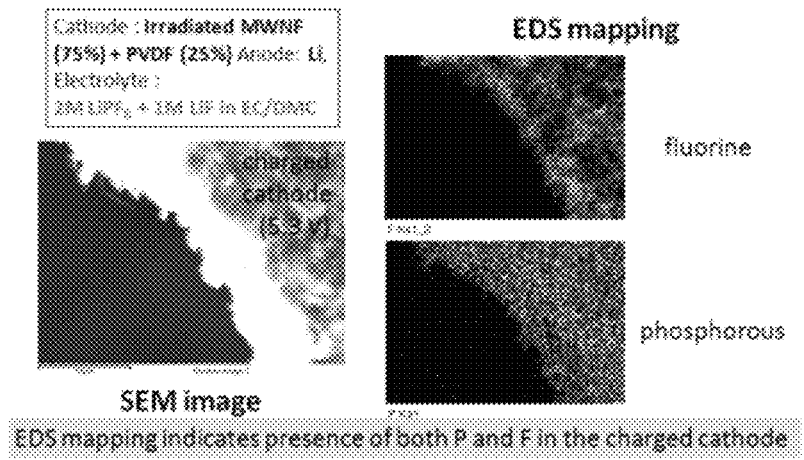
FIG. 7 shows characterizing data for the positive electrode in a symmetric carbon nanotube cell with 0.5 M LiF/1M $LiPF_6$ in EC/DMC after charging to 5.3 Volts.
Figure 8:
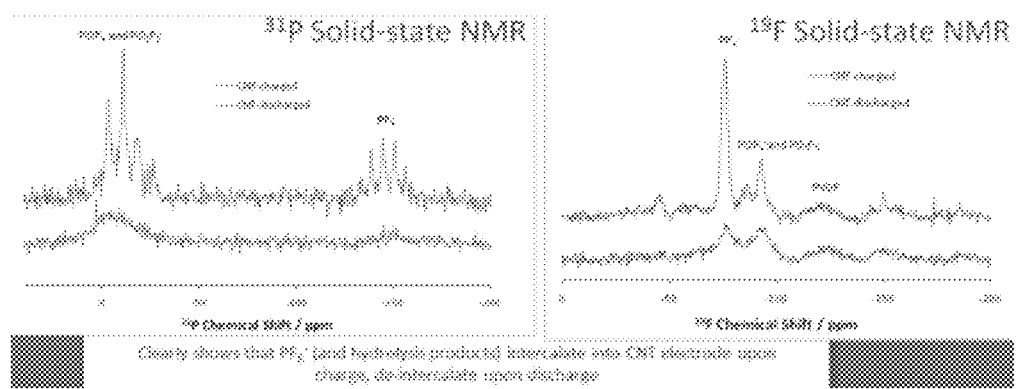
FIG. 8 shows 31P and 19F solid-state NMR data for the carbon nanotube positive electrode after charging to 5.3 V and after discharging to 3.0 V.

9) Characterizing Data for Carbon Electrodes Cycled with 0.5 M LiF/1M $LiPF_6$ in EC/DMC Electrolyte Providing a sufficient amount of charge carrying F⁻ anions for FIB cells can be difficult to achieve, and can require careful selection of reactants and solvents for best results. For examples, US Published Patent Application 2009/0029237 reports that cycling a carbon electrode using an electrolyte such as 0.5 M LiF/1M $LiPF_6$ in EC/DMC will result in reversible incorporation of F⁻ into the positive electrode upon charge, with the release of F⁻ upon discharge. However, Seel and Dahn, J. Electrochem. Soc., 147, 892 (2000) and West et al., J. Electrochem. Soc., 154, A929 (2007) indicate that under similar experimental conditions the carbon structure does accommodate the additional anions in the electrolyte ($PF_6^-$ from the work of Seel and Dahn, and boron species from the work of West et al.). Further investigation has shown that charging of a symmetric carbon nanotube cell (both electrodes are carbon nanotube materials, with binder) with 0.5 M LiF/1M $LiPF_6$ in EC/DMC to 5.3 V clearly results in accommodation of $PF_6^-$ into the positive electrode, as shown by EDS mapping (FIG. 7). Detailed $^{31}P$ and $^{19}F$ solid-state NMR studies of the carbon nanotube positive electrode after charging to 5.3 V and discharging to 3.0 V indicate the characteristic presence of $PF_6^-$ and hydrolysis products (as identified by their chemical shift and coupling patterns) in the carbon structure after charging and the significant reduction of the concentration of P-containing species after discharging (FIG. 8). Therefore, these data and those detailed in Example 8, indicate that electrolytes such as 0.5 M LiF/1M $LiPF_6$ in EC/DMC do not provide a source of $F^-$ for FIB cells that is useful for electrochemical reaction in the absence of participation of reactions of the counter ions (e.g. $PF_6$).

Figure 9:
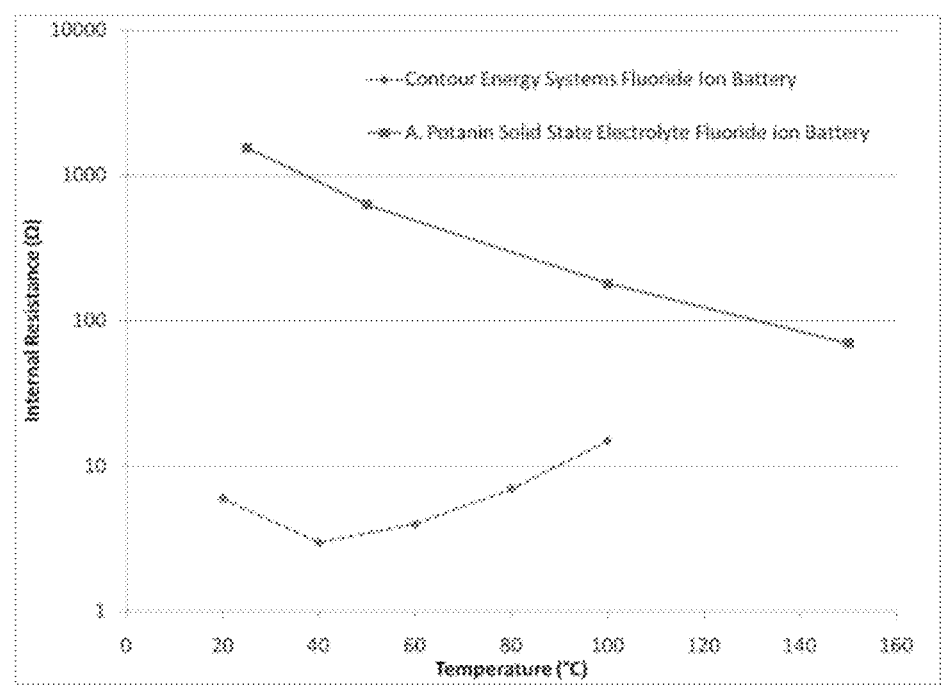
FIG. 9 shows internal resistance data measured for a $PbF_2$/TMAF-MPPTFSI/PANI cell in the charged state from 20-100° C., alongside comparative data for a solid-state FIB cell as reported in http://www.sandia.gov/mission/ste/battery.pdf.
Figure 10:
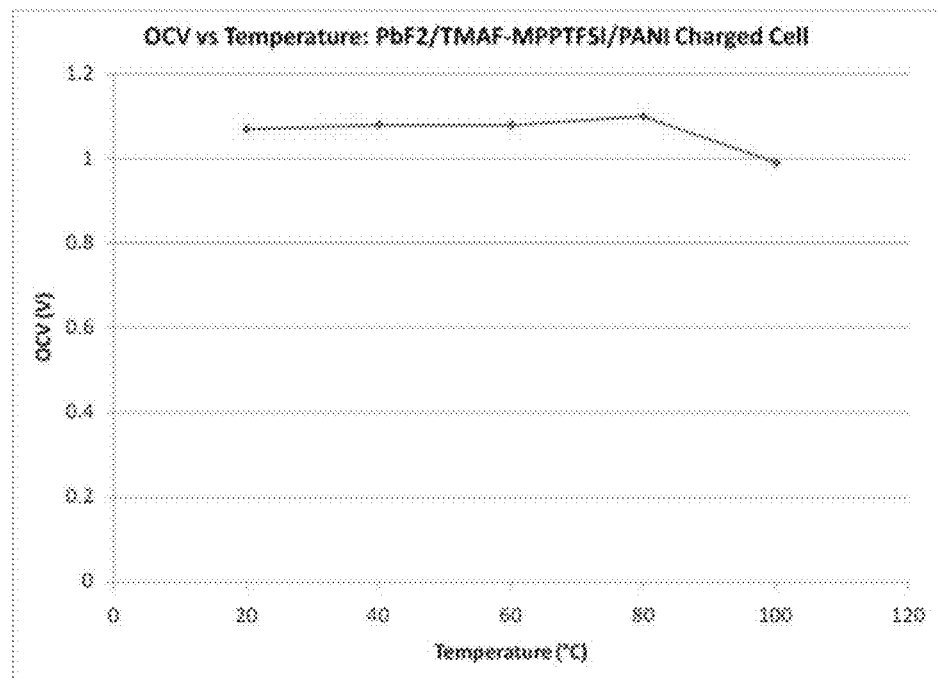
FIG. 10 shows OCV values for a $PbF_2$/TMAF-MPPTFSI/PANI cell in the charged state measured from 20-100° C.

10) Internal Resistance and Open-Circuit Voltage (OCV) for Typical Liquid Phase-Electrolyte FIB Cell FIG. 9 shows internal resistance data ($\Omega$) measured for a PbF2/TMAF-MPPTFSI/PANI cell in the charged state from 20-100° C., alongside comparative data for a solid-state FIB cell as reported in http://www.sandia.gov/mission/ste/battery.pdf The internal resistance values for the liquid-electrolyte FIB cell are at least one order of magnitude below that for the solid-state system, and do not vary significantly across the temperature range studied. FIG. 10 shows OCV values for a PbF2/TMAF-MPPTFSI/PANI cell in the charged state as measured from 20-100° C., indicating a stable OCV around 1 V across this temperature range.

11) Discharge of a Pb/0.1 M TMAF-MPPTFSI/PANI–F (charged state) cell

Figure 11:
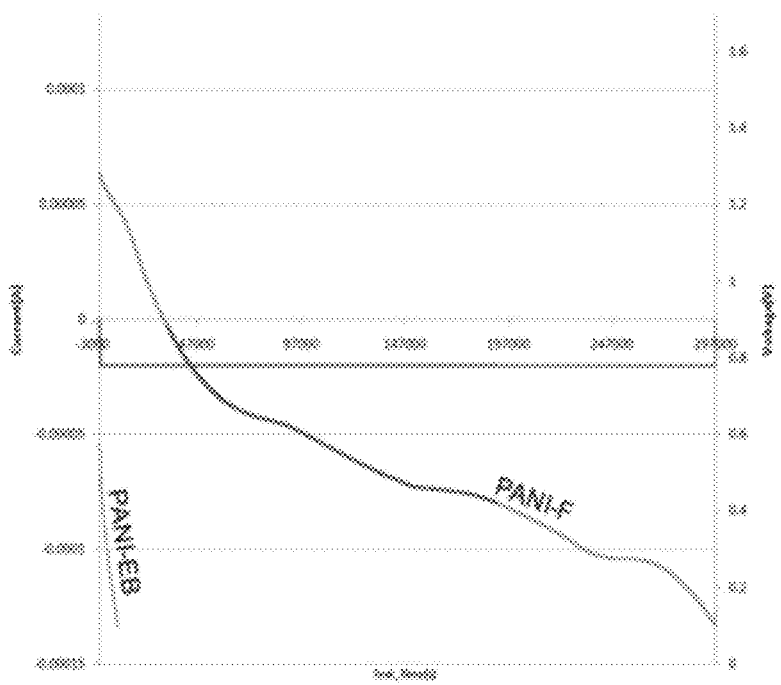
FIG. 11 shows a discharge profile of a Pb/0.1 M TMAF-MPPTFSI/PANI–F cell compared to a Pb/0.1M TMAF-MPPTFSI/PANI cell (containing no F— in the cathode)

FIG. 11 shows the discharge profile of a Pb/0.1M TMAF-MPPTFSI/PANI–F (charged state) cell, with significant capacity. For comparison, the same cell with undoped PANI (containing no F— ions) has a negligible capacity, indicating the requirement for mobile F— to be present in the cathode for discharge to occur.

12) Charge-Discharge of a $BiF_3$/TMAF-MPPTFSI/PANI cell

Figure 12:
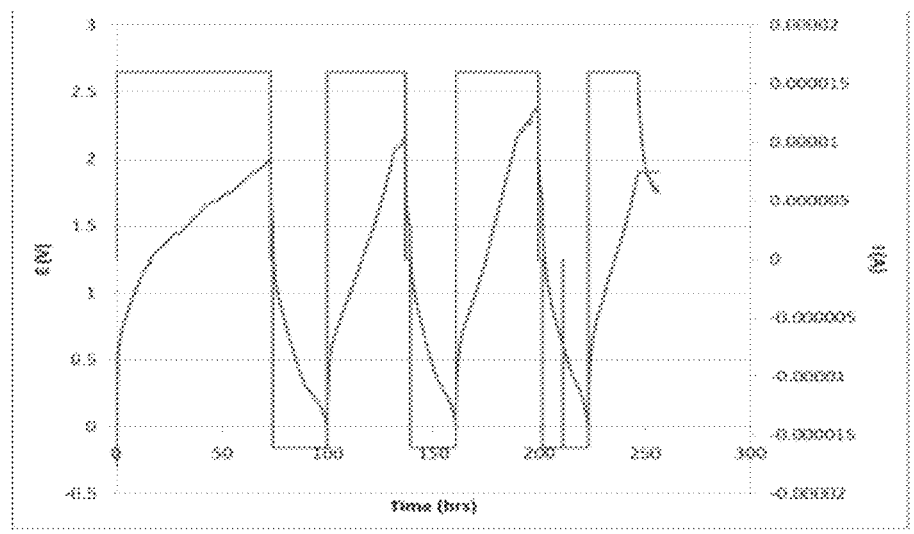
FIG. 12 shows cycling of a $BiF_3$/0.1M TMAF-MPPTFSI/PANI cell.

FIG. 12 shows the charge-discharge profile of a BiF3/0.1M TMAF-MPPTFSI/PANI cell (assembled in the discharged state), with significant reversible capacity over three cycles.

Figure 13:
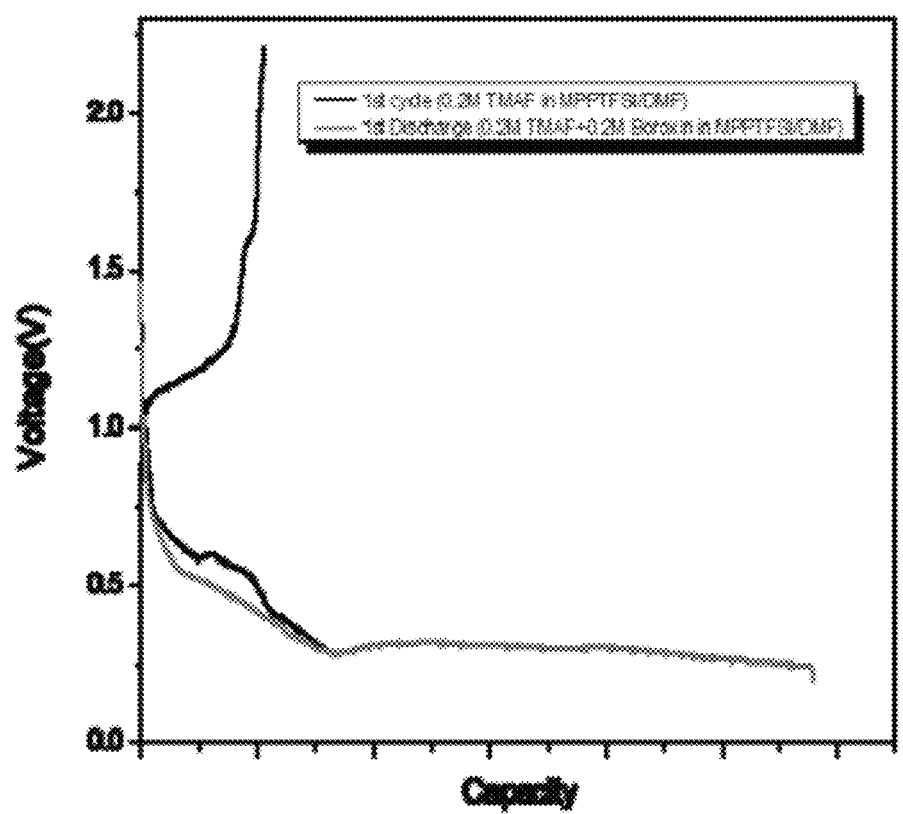
FIG. 13 shows a discharge profile of a La/0.2M TMAF-MPPTFSI/$PbF_2$ cell, with recharge capability indicated, compared to discharge of a La/0.2M TMAF-MPPTFSI with an additive of 0.2M boroxin/$PbF_2$ cell.

13) Discharge of La/0.2M TMAF-MPPTFSI/$PbF_2$ cells:

FIG. 13 shows the discharge profile of a La/0.2M TMAF-MPPTFSI/PbF2 cell and the discharge profile of the same configuration cell using 0.2M TMAF-MPPTFSI with 0.2M boroxin in the electrolyte. This system displays some capability to be recharged, and displays a greater discharge capacity upon addition of boroxin additive to the electrolyte.

14) Charge-Discharge Characteristics of $PbF_2$/EMIF $(HF)_n$/PANI Cell

Figure 14:
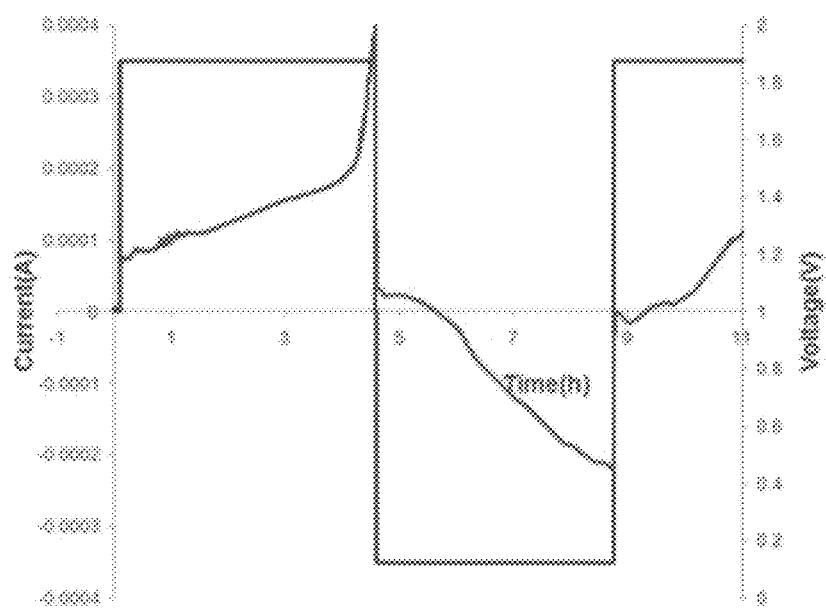
FIG. 14 shows the charge-discharge profile of a $PbF_2$/PANI system using the acidic ionic liquid fluoride electrolyte $EMIF(HF)_n$.

FIG. 14 shows the charge-discharge profile of a $PbF_2$/PANI system using the acidic ionic liquid fluoride electrolyte EMIF $(HF)_n$, indicating significant reversible capacity in this system.

All references throughout this application, for example non-patent literature documents or other source material; are hereby incorporated by reference herein in their entireties, as though individually incorporated by reference, to the extent each reference is at least partially not inconsistent with the disclosure in this application The terms and expressions which have been employed herein are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed in various embodiments; optional features, modification and variation of the concepts herein disclosed may be resorted to by those skilled in the art, and such modifications and variations are considered to be within the scope of this invention as defined by the claims. As will be understood by one of skill in the art, methods and devices useful for the present methods can include a large number of optional composition and processing elements and steps. When a group of substituents is disclosed herein, it is understood that all individual members of that group and all subgroups, including any isomers, enantiomers, and diastereomers of the group members, are disclosed separately. When a Markush group or other grouping is used herein, all individual members of the group and all combinations and subcombinations possible of the group are intended to be individually included in the disclosure. When a compound is described herein such that a particular isomer, enantiomer or diastereomer of the compound is not specified, for example, in a formula or in a chemical name, that description is intended to include each isomers and enantiomer of the compound described individual or in any combination. Additionally, unless otherwise specified, all isotopic variants of compounds disclosed herein are intended to be encompassed by the disclosure. Many of the molecules disclosed herein contain one or more ionizable groups. All possible ionic forms of such molecules and salts thereof are intended to be included individually in the disclosure herein. With regard to salts of the compounds herein, one of ordinary skill in the art can select from among a wide variety of available counterions those that are appropriate for preparation of salts of this invention for a given application. In specific applications, the selection of a given anion or cation for preparation of a salt may result in increased or decreased solubility of that salt. Every formulation or combination of components described or exemplified herein can be used to practice the invention, unless otherwise stated. Whenever a range is given in the specification, for example, a temperature range, a time range, or a composition or concentration range, all intermediate ranges and subranges, as well as all individual values included in the ranges given are intended to be included in the disclosure. It will be understood that any subranges or individual values in a range or subrange that are included in the description herein can be excluded from the claims herein. All art-known functional equivalents, of any such materials and methods are intended to be included in this invention. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the following claims.

What is claimed is:

1. A fluoride ion battery comprising:
an anode
a cathode,
an electrolyte comprising an ionic liquid solvent, and a dissolved fluoride salt, the electrolyte being liquid at a temperature less than 200 degrees Celsius and the fluoride salt comprising a fluoride anion and a cation comprising an organic group or comprising a metal-organic species, a substituted metal-organic species or a metal-coordination complex species.

2. The fluoride ion battery of claim 1, wherein the electrolyte further comprises an additive that reduces viscosity of the electrolyte.

3. The fluoride ion battery of claim 1, wherein the electrolyte is liquid at a temperature of less than 100 degrees Celsius.

4. The fluoride ion battery of claim 1, wherein the electrolyte further comprises a fluoride complexing species comprising at least one of boron, aluminum, ammonium, aza ether, or an H-bond donor.

5. The fluoride ion battery of claim 4, wherein the fluoride complexing species comprises at least one of: tris(hexafluoroisopropyl)borate; tris(pentafluorophenyl)borane; difluorophenylboroxin, and regioisomers thereof; trifluorophenyl boroxin; bis(trifluoromethyl)phenyl boroxin; itrifluoromethyl)phenyl boroxin; and, fluoro(trifluoromethyl)phenyl boroxin.

6. The fluoride ion battery of claim 1, wherein the ionic liquid solvent comprises at least one of 1-methyl-1-propylpiperidinium bis(trifluoromethanesulfonyl)imide; butyltrimethylammonium bis(trifluoromethanesulfonyl)imide; 1-butyl, 1-methylpyrrolidinium bis(trifluoromethanesulfonyl)imide; or fluoroalkylphosphate anion derivatives thereof.

7. The fluoride ion battery of claim 1, wherein electrochemical reactions between the anode and the cathode are reversible to allow a rechargeable battery.

8. The fluoride ion battery of claim 1, wherein electrochemical reactions between the anode and the cathode are substantially irreversible to form a primary battery.

9. A fluoride ion battery comprising:
a substantially lithium-free anode and cathode, with at least one of the anode or cathode containing fluorine, and
a substantially lithium-free liquid electrolyte comprising an ionic liquid and an organic-soluble fluoride salt, wherein the electrolyte is liquid at a temperature less than 200 degrees Celsius and the organic-soluble fluoride salt comprises a fluorine anion and a cation comprising an organic group or comprising a metal-organic species, a substituted metal-organic species or a metal-coordination complex species.

10. The fluoride ion battery of claim 9, wherein the electrolyte further comprises at least one of acetone, acetonitrile, benzonitrile, 4-fluorobenzonitrile, pentafluorobenzonitrile, triethylamine, diisopropylethylamine, 1,2-dimethoxyethane, ethylene carbonate, propylene carbonate, γ-butyrolactone, dimethyl carbonate, diethyl carbonate, methyl ethyl carbonate, propyl methyl carbonate, tetrahydrofuran, 2-methyltetrahydrofuran, nitromethane, benzene, toluene, chloroform, dichloromethane, 1,2-dichloroethane, dimethylsulfoxide, sulfolane, N,N-dimethylformamide, N,N-dimethylacetamide, carbon disulfide, ethyl acetate, methyl butyrate, n-propyl acetate, methyl propionate, methyl formate, 4-methyl-1,3,-dioxolane, pyridine, methyl isobutyl ketone, methyl ethyl ketone, hexamethylphosphoramide, hexamethylphosphorus triamide, 1-methyl-2-pyrrolidinone, 2-methoxyethyl acetate, trimethyl borate, triethylborate and substituted derivatives thereof, ethylmethylsulfone, trimethylene sulfone, 1-methyltrimethylene sulfone, ethyl-sec-butyl sulfone, ethyl isopropyl sulfone, 3,3,3-trifluoropropylmethyl sulfone, and 2,2,2-trifluoroethyl sulfone.

11. The fluoride ion battery of claim 9, wherein the organic-soluble fluoride salt comprises at least one of:
1,2-bis(dimethylamino)-1,2-bis(dimethylammonium) ethene difluoride;
hexamethylguanidinium fluoride;
1-propyl, 1-methyl-piperidinium fluoride;
1,1,3,3,5,5-hexamethylpiperidinium fluoride;
1-methylhexamethylenetetramine fluoride;
tetramethylphosphonium fluoride;
tetraphenylphosphonium fluoride;
phenyltrimethylphosphonium fluoride;
trimethylsulfonium fluoride;
tetramethylammonium fluoride;
neopentyltrimethylammonium fluoride;
cobaltocenium fluoride;
poly(1,1-dimethyl-3,5-dimethylene piperidinium)fluoride;
dimethylpropyltrimethylammonium fluoride;
1-adamantyltrimethylammonium fluoride;
phenyltrimethylammonium fluoride;
an alkylammonium or substituted alkylammonium cation according to the formula $R^1, R^2R^3N^+F^-$;
an alkylammonium or substituted alkylammonium cation, wherein one or more R-groups is joined to two or more alkylammonium cations to provide a dimer, oligomer or polymer according to the formula $(R^1R^2R^3R^4N^+)_x(F^-)_x$, wherein x is 2 to 50;
an alkylguanidinium and substituted alkylguanidinium cation according to the formula $(R^1R^2N)^3{-}C^+F^-$;
a fluoride salt in the form of $X^+F^-$ wherein X is a heterocyclic cation, the heterocyclic ring comprising 4 to 7 atoms; a benzoannelated heterocyclic cation, a polycyclic heterocyclic cation, and or a heterocyclic cation substituted at one or more positions with a substituted or unsubstituted, linear or branched, $C_1$ to $C_{50}$ aliphatic or cyclic aliphatic, fluoroalkyl, oligo(ethyleneglycol), aryl or a substituted aryl group;
a phosphazene or phosphazenium-containing compound, selected from 1,1,1,3,3,3-hexakis(dimethylamino) diphosphazenium fluoride and
tetrakis[tris(dimethylamino)phosphoranylidenamino] phosphonium fluoride;
an alkylphosphonium or substituted alkylphosphonium cation according to the formula $R^1R^2R^3R^4P^+F^-$;
alkylsulfonium or substituted alkylsulfonium cation according to the formula $R^1R^2R^3S^+F^-$;
and,
a cation polymer compound comprising -[Z-Het+-X-Het+-]-n, wherein Het is a heterocyclic cation comprising 4-7 atoms; a benzoannelated heterocyclic cation, a polycyclic heterocyclic cation and or a heterocyclic cation substituted at one or more positions with a substituted or unsubstituted, linear or branched, $C_1$ to $C_{50}$ aliphatic or cyclic aliphatic, fluoroalkyl, oligo(ethyleneglycol), aryl or a substituted aryl groups; wherein Z and X are spacer groups comprising at least one of $CH_2$, $CMe_2$, $SiMe_2$, $SO_2$, P=O, $C_2$ to $C_{50}$, aliphatic or cyclic aliphatic, fluoroalkyl, oligo(ethyleneglycol), aryl or a substituted aryl group, and n is 1 to 8 wherein $R^1$, $R^2$, $R^3$ and $R^4$ are independently substituted or unsubstituted, linear or branched $C_1$ to $C_{50}$ aliphatic or cclic aliphatic fluoroalkl, olio(ethyleneglycol), aryl or a substituted aryl group.

12. The fluoride ion battery of claim 9, wherein the organic-soluble fluoride salt comprises a metal-organic, a substituted metal-organic or a metal-coordination complex species

wherein $R^1 \ldots R^N$ comprise a ligand species selected from at least one of a carbocyclic or heterocyclic organometallic ligand, n is independently 1 to 8 for each occurrence, N is 1 to 8, and M is metal species.

13. The fluoride ion battery of claim 12, wherein the carbocyclic or heterocyclic organometallic ligand comprises at least one of a cyclopentadienyl, benzene, cyclobutadiene, pyridine, phenanthroline or phosphacyclopentadienyl, isolobal analogues thereof, unsubstituted or substituted with a linear or branched, $C_1$ to $C_{50}$ aliphatic or cyclic aliphatic, fluoroalkyl, oligo(ethyleneglycol), aryl or substituted aryl group, alkyl, alkene, alkyne, alkynyl, carbonyl, amine, phosphine, halide, hydride, nitrile, or isonitrile.

14. The fluoride ion battery of claim 12, wherein the metal species comprises a main-group metal, transition metal or lanthanide metal.

15. A fluoride ion battery comprising
an anode
a cathode, and
an electrolyte comprising at least one of an ionic liquid fluoride or acidic ionic liquid fluoride, the ionic liquid fluoride or acidic ionic liquid fluoride being liquid at room temperature.

16. The fluoride ion battery of claim 15, wherein the ionic liquid fluoride or acidic ionic liquid fluoride comprises $X^+F^-(HF)_n$, wherein $X^+$ comprises at least one of an organic-soluble cation, wherein n is 0 to 5.

17. The fluoride ion battery of claim 9, wherein the ionic liquid comprises at least one of 1-methyl-1-propylpiperidinium bis(trifluoromethanesulfonyl)imide; butyltrimethylammonium bis(trifluoromethanesulfonyl)imide; 1-butyl, 1-methylpyrrolidinium bis(trifluoromethanesulfonyl)imide; or fluoroalkylphosphate anion derivatives thereof.

18. The fluoride ion battery of claim 9, wherein the molar concentration of the organic-soluble fluoride salt is 0.01 to 3 M.

19. The fluoride ion battery of claim 1, wherein the molar concentration of the fluoride salt is from 0.01 to 3 M.

20. The fluoride ion battery of claim 1, wherein the fluoride salt comprises at least one of:
1,2-bis(dimethylamino)-1,2-bis(dimethylammonium) ethene difluoride;
hexamethylguanidinium fluoride;
1-propyl, 1-methyl-piperidinium fluoride;
1,1,3,3,5,5-hexamethylpiperidinium fluoride;
1-methylhexamethylenetetramine fluoride;
tetramethylphosphonium fluoride;
tetraphenylphosphonium fluoride;
phenyltrimethylphosphonium fluoride;
trimethylsulfonium fluoride;
tetramethylammonium fluoride;
neopentyltrimethylammonium fluoride;
cobaltocenium fluoride;
poly(1,1-dimethyl-3,5-dimethylene piperidinium)fluoride;
dimethylpropyltrimethylammonium fluoride;
1-adamantyltrimethylammonium fluoride;
phenyltrimethylammonium fluoride;
an alkylammonium or substituted alkylammonium cation according to the formula $R^1R^2R^3N^+F^-$,
an alkylammonium or substituted alkylammonium cation, wherein one or more R-groups is joined to two or more alkylammonium cations to provide a dimer, oligomer or polymer according to the formula $(R^1R^2R^3R^4N^+)_x(F^-)_x$, wherein x is 2 to 50;
an alkylguanidinium and substituted alkylguanidinium cation according to the formula $(R^1R^2N)^3$—$C^+F$;
a fluoride salt in the form of $X^+F^-$ wherein X is a heterocyclic cation, the heterocyclic ring comprising 4 to 7 atoms; a benzoannelated heterocyclic cation, a polycyclic heterocyclic cation, or a heterocyclic cation substituted at one or more positions with a substituted or unsubstituted, linear or branched, $C_1$ to $C_{50}$ aliphatic or cyclic aliphatic, fluoroalkyl, oligo(ethyleneglycol), aryl or a substituted aryl group;
a phosphazene or phosphazenium-containing compound-selected from 1,1,1,3,3,3-hexakis(dimethylamino) diphosphazenium fluoride and tetrakis[tris(dimethylamino)phosphoranylidenamino]phosphonium fluoride;
an alkylphosphonium or substituted alkylphosphonium cation according to the formula $R^1R^2R^3R^4P^+F^-$;
alkylsulfonium or substituted alkylsulfonium cation according to the formula $R^1R^2R^3S^+F^-$;
and,
a cation polymer compound comprising -[Z-Het+-X-Het+-]-n, wherein Het is a heterocyclic cation comprising 4-7 atoms; a benzoannelated heterocyclic cation, a polycyclic heterocyclic cation or a heterocyclic cation substituted at one or more positions with a substituted or unsubstituted, linear or branched, $C_1$ to $C_{50}$ aliphatic or cyclic aliphatic, fluoroalkyl, oligo(ethyleneglycol), aryl or a substituted aryl groups;
wherein Z and X are spacer groups comprising at least one of $CH_2$, $CMe_2$, $SiMe_2$, $SO_2$, P=O, $C_2$ to $C_{50}$, aliphatic or cyclic aliphatic, fluoroalkyl, oligo(ethyleneglycol), aryl or a substituted aryl group, and n is 1 to 8
wherein $R^1$, $R^2$, $R^3$ and $R^4$ are independently substituted or unsubstituted, linear or branched, $C_1$ to $C_{50}$ aliphatic or cyclic aliphatic, fluoroalkyl, oligo(ethyleneglycol), aryl or a substituted aryl group.

21. The fluoride ion battery of claim 1, wherein the fluoride salt comprises a metal-organic, a substituted metal-organic or a metal-coordination complex species

wherein $R^1 \ldots R^N$ comprise a ligand species selected from at least one of a carbocyclic or heterocyclic organometallic ligand, n is independently 1 to 8 for each occurrence, N is 1 to 8, and M is metal species.

22. The fluoride ion battery of claim 21, wherein the carbocyclic or heterocyclic organometallic ligand comprises at least one of a cyclopentadienyl, benzene, cyclobutadiene, pyridine, phenanthroline or phosphacyclopentadienyl, isolobal analogues thereof, optionally substituted with a linear or branched, $C_1$ to $C_{50}$ aliphatic or cyclic aliphatic, fluoroalkyl, oligo(ethyleneglycol), aryl or substituted aryl group, alkyl, alkene, alkyne, alkynyl, carbonyl, amine, phosphine, halide, hydride, nitrile, or isonitrile.

23. The fluoride ion battery of claim 21, wherein the metal species comprises a main-group metal, transition metal or lanthanide metal.

24. The fluoride ion battery of claim 6, wherein the ionic liquid solvent comprises a hydrophobic anion.

25. The fluoride ion battery of claim 16, wherein the acidic ionic liquid fluoride is acidic 1-ethyl-3-methylimidazolium fluoride(EMIF) according to the formula $(EMIF.(HF)_{2.3})$; or acidic 1-methyl-1-propylpiperidinium fluoride(MPPF) according to the formula (MPPF.(HF)n) wherein n is about 2.3.

* * * * *